Dec. 24, 1929.    W. O. LYTLE    1,740,989
APPARATUS FOR MAKING COMPOSITE GLASS
Filed Feb. 5, 1928    4 Sheets-Sheet 2
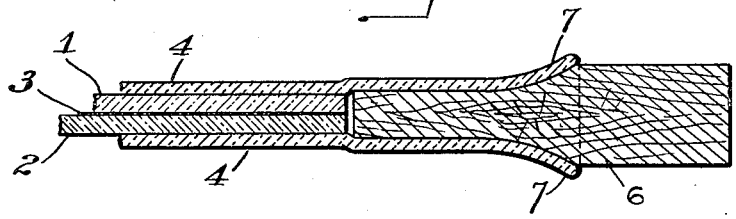
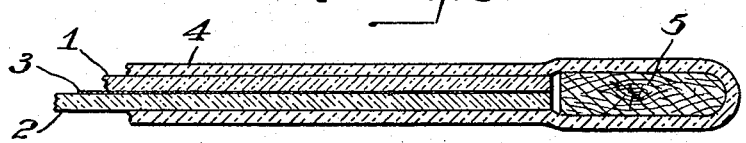
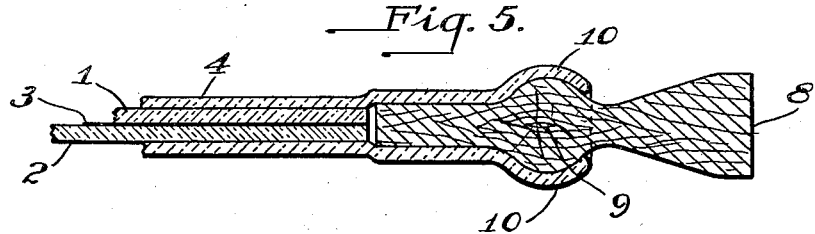
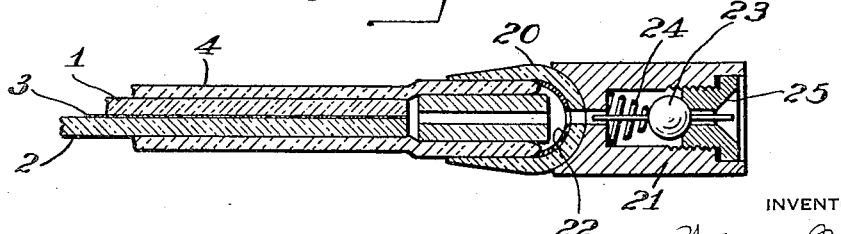
INVENTOR
William O. Lytle
by
James C. Bracey
atty Dec. 24, 1929.  W. O. LYTLE  1,740,989
APPARATUS FOR MAKING COMPOSITE GLASS
Filed Feb. 6, 1928  4 Sheets-Sheet 3

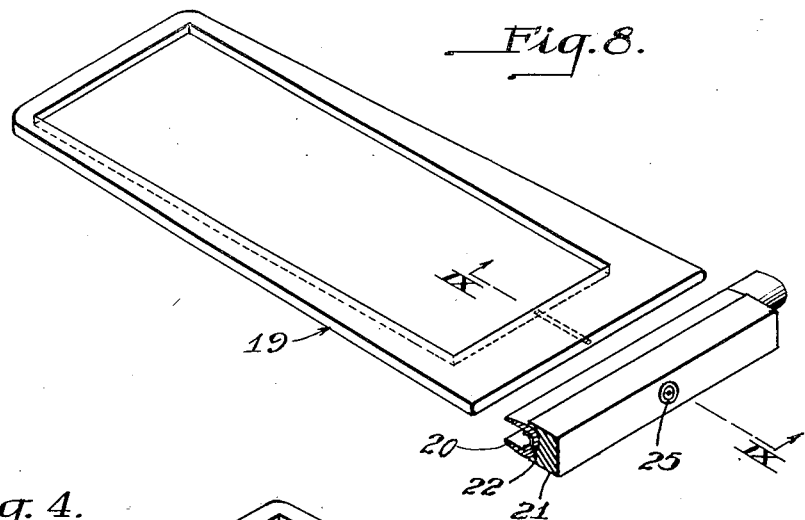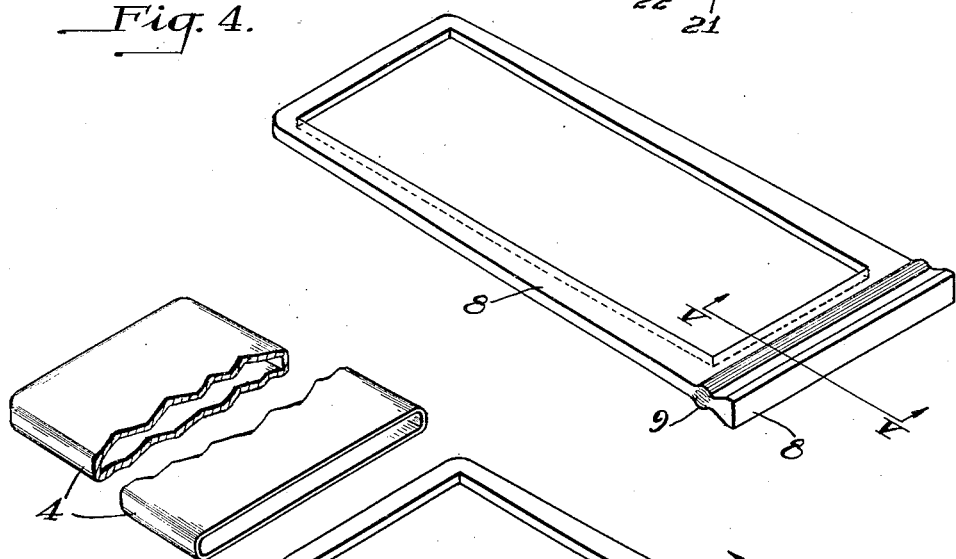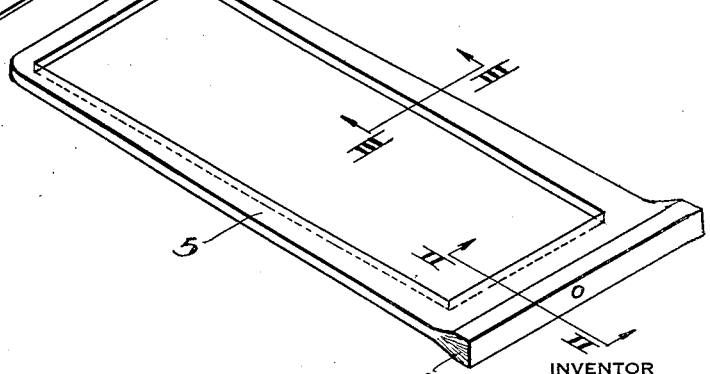

INVENTOR
William O. Lytle
by
James C. Bradley
atty

Dec. 24, 1929.　　　　W. O. LYTLE　　　　1,740,989
APPARATUS FOR MAKING COMPOSITE GLASS
Filed Feb. 6, 1928　　　4 Sheets-Sheet 4

INVENTOR
William O. Lytle
by
James C. Bracey

Patented Dec. 24, 1929

1,740,989

UNITED STATES PATENT OFFICE

WILLIAM O. LYTLE, OF NEW KENSINGTON, PENNSYLVANIA, ASSIGNOR TO PITTSBURGH PLATE GLASS COMPANY, A CORPORATION OF PENNSYLVANIA

APPARATUS FOR MAKING COMPOSITE GLASS

Application filed February 6, 1928. Serial No. 252,207.

Figure 7:
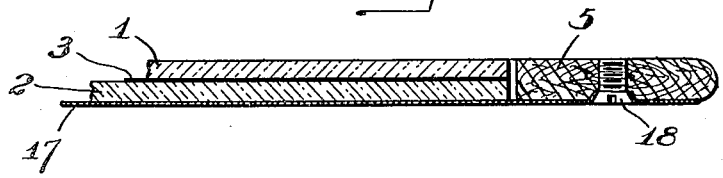
Figure 6:
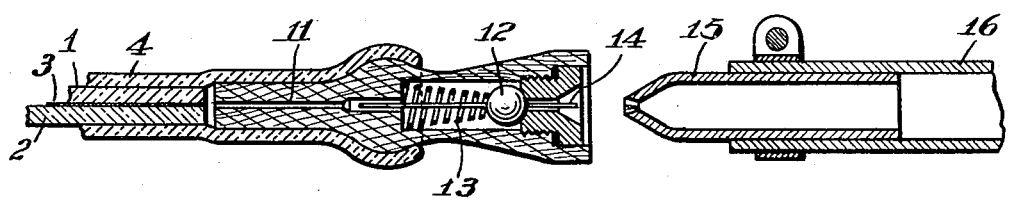
Figure 10:
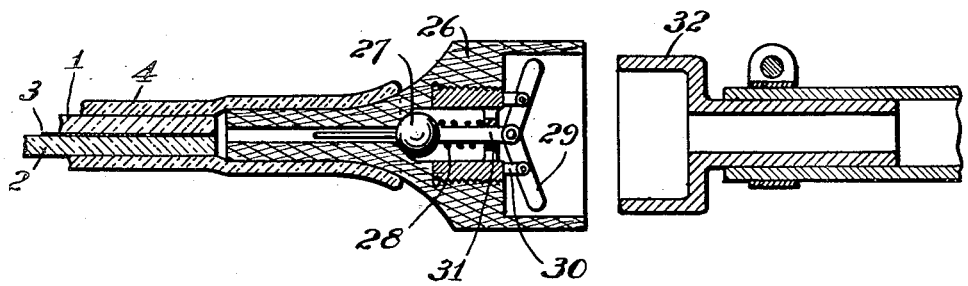
Figure 11:
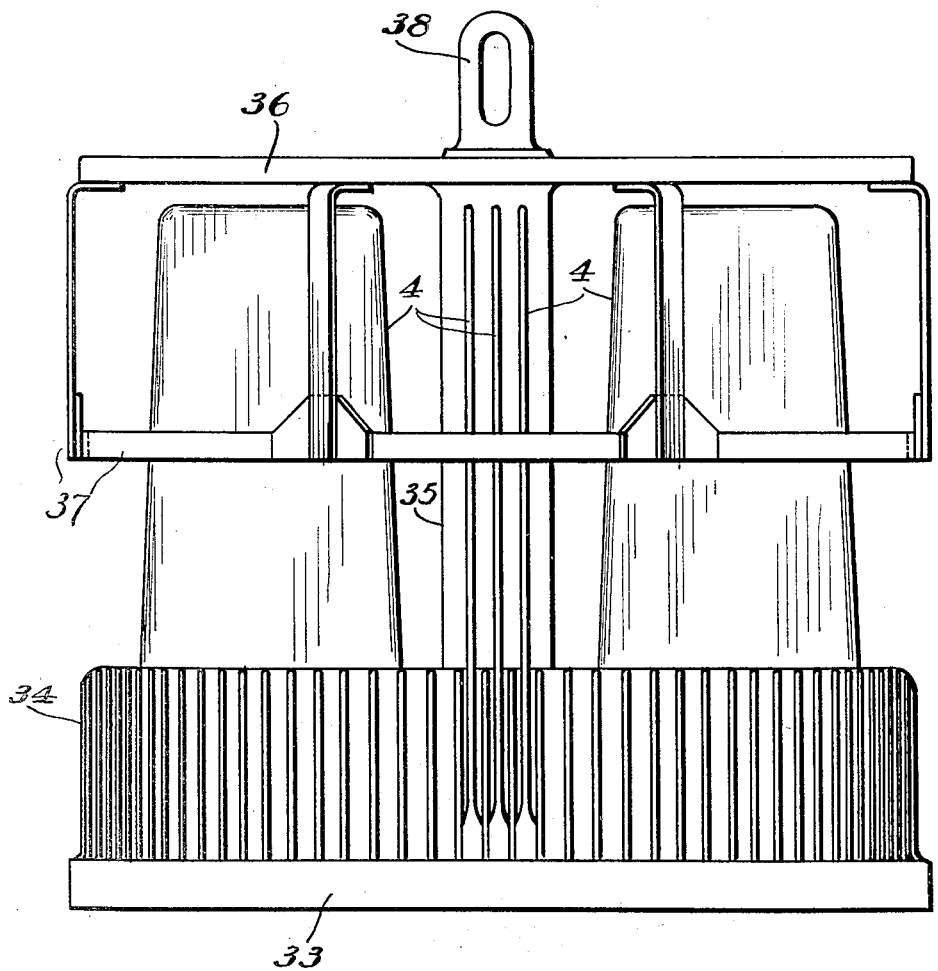

The invention relates to an apparatus for making composite glass, and particularly to the process and means for applying heat and pressure to cause the joinder between the glass and celluloid. Composite glass ordinarily comprises two sheets of glass with a sheet of celluloid or equivalent cemented therebetween, although a greater or less number of layers of material may be employed. It is preferred to assemble the sheets with a coating of cement, such as gelatin dried upon the surfaces of the glass sheets, which are to be cemented to the celluloid, the heat subsequently applied to the assembled sheets serving to soften the gelatin and secure adhesion when pressure is applied, but it will be understood that the apparatus may be used in other ways. For instance, a sufficient amount of heat and pressure will cause the adherence of the celluloid to the glass without the use of any cement, particularly if a solvent is applied to the celluloid, and the invention may be employed in such way, if desired. The invention has for its principal objects the provision of an apparatus of the type employing containers or bags of rubber composition wherein improved means are employed for protecting the containers against cutting or abrasion by the glass; the provision of apparatus of the type specified whereby the pressure applied to the margins of the sheets is reduced as compared with that applied to the sheets inside such margins, thus preventing the edge portions of the celluloid sheets from being thinned and squeezed out beyond the edges of the glass sheets; and the provision of apparatus of the type specified in which the labor incident to the insertion of the sheets into the rubber containers and their removal therefrom is reduced, and any relative movement of the sheets over each other during the operation of placing them in the containers is avoided. Certain embodiments of the invention are shown in the accompanying drawings, wherein:

Figure 1 is a perspective view of the rubber bag and the glass carrying frame to be used therewith. Figs. 2 and 3 are sections on the lines II—II and III—III of Fig. 1. Fig. 4 is a perspective view of a modified form of frame. Fig. 5 is a section on the line V—V of Fig. 4 after the frame has been placed in a rubber container. Fig. 6 is a similar view taken at the plane carrying the valve. Fig. 7 is a section through a modified form of frame. Fig. 8 is a perspective view showing a modified form of frame and the closure employed for the container when such frame is used. Fig. 9 is a section taken at the valve in a construction employing the frame and closure of Fig. 8. Fig. 10 is a section showing a modified form of valve. And Fig. 11 is a side elevation of the frame or rack in which the containers and their contents are placed preliminary to inserting them in the hydraulic press.

In carrying out the process, the sheets to be joined together are assembled, as indicated in Fig. 2, wherein 1 and 2 are glass sheets and 3 is the interposed sheet of celluloid or other similar material. These plates have been previously treated to prepare them for the pressing operation, such treatment involving the cleaning of the glass and celluloid plates and the application to one side of each of the glass sheets of a thin film of gelatin or other cement. This cement is of such a character that when the celluloid sheet is placed between the two sheets of glass and heat and pressure applied thereto, the cement will be softened and the sheets will be securely attached together when the composite plate is cooled off, it being desirable that this cooling off should occur while the sheets are under pressure. If gelatin is used as a cement, the heat ordinarily applied will be about 250 deg. F. and the pressure about 150 lbs. per square inch. The temperature specified is sufficient to slightly soften the celluloid, so that the opposing faces of the celluloid and glass are brought into intimate contact. As later described, hydraulic pressure is preferably employed, heated liquid being used so that the liquid as thus applied, not only gives the desired degree of pressure, but also provides a medium for softening the gelatin so that the sheets are heated and pressed at one operation. Under these conditions, it is, of course, necessary that the pressure should be applied to the outer faces of the sheets to be joined, but not to the edges of the sheets where they come into contact, since pressure applied at the lines of joinder between the plates would tend to separate them so that the pressure on the faces of the sheets would be ineffective to secure the desired result.

The means employed for preventing the application of pressure to the juncture between the sheets will be seen by reference to Figs. 1, 2 and 3. This means comprises the container or bag 4 of rubber composition and the frame 5 adapted to carry the sheets 1, 2 and 3 to be joined and of such size that it will fit snugly into the container 4. In order to facilitate the insertion and removal of the frame 5 into the container, the frame and container are slightly tapered. The outer end 6 of the frame is thicker than the body of the frame, and when the frame with the contained sheets is placed in the container, the end edges 7, 7 of the container fit up around the thickened end 6 of the frame and make a tight seal therewith, due to the fact that the rubber is stretched. As indicated in Figs. 2 and 3, the frame 5 is slightly thicker than the combined thickness 1, 2 and 3. This tends to reduce the pressure imposed upon the sheets at their extreme edges, which is desirable, as the pressure at this point tends to thin the celluloid and squeeze it out.

Figs. 4 and 5 show a modification of the frame 8, wherein the outer end is provided with a bead 9 to increase the effectiveness of the seal between the end edges 10, 10 of the container 4. The end members of the frames 5 and 8 are preferably provided with a valve control, as indicated in Fig. 6. A passage 11 extends through the frame and is closed by the ball valve 12 pressed outward by the spring 13. This valve is provided with a stem 14 adapted to be pressed inward by the tip 15 carried by the hose 16. This arrangement provides for either the exhausting of the air from the interior of the container 4 or for the application of pressure thereto. When it is desired to exhaust the air from the container, the tip 15 is pushed inward engaging the stem 14 and opening the valve and suction is applied to the hose 16, thus removing the major portion of the air from the interior of the container, the tip 15 being withdrawn when this exhausting operation is completed. After the pressing of the glass in the hydraulic container, as heretofore referred to, it is necessary to remove the frame carrying the composite plate from the container 4, and at such time, the tip 15 is again applied to the stem 14 to open the valve 12 and a small amount of air under pressure admitted to permit the ready removal of the frame from the container 4.

If desired, the frames 5 and 8, each carrying the glass sheets, may be provided with a bottom member 17 of sheet metal or strong fabric, such as canvas, for supporting the plates 1, 2 and 3 during their insertion into the rubber container, such bottom member being held in position by means of the countersunk screws 18. The provision of this bottom member facilitates the insertion and removal of the sheets, as it is not necessary to hold the sheets flush with the frame and the danger of scratching the glass on any small particles which may remain in the bag is avoided.

Fig. 8 illustrates another modification in which the frame 19 is designed to be inserted entirely in the rubber container, after which the cap member 20 is snapped over the end of the bag, as indicated in Fig. 9. The cap member comprises a member of rubber composition, U-shape in cross section, and having a reinforcing strip 21 secured thereto. The member 20 is provided upon its inner side with a U-shaped clip 22 of sheet metal, which holds it firmly while springing it open in order to permit of the application of the cap to the end of the container. This construction provides a satisfactory seal because of the thin lip effect provided by the member 20 and because of the rubber to rubber contact between the member 20 and the end surfaces of the bag. In this construction, as in the others, a valve 23 is provided held closed by the spring 24 and seating against the screw plug 25.

Fig. 10 illustrates still another modification of the frame and valve construction, the frame member 26 in this case being provided with a valve 27 held closed by the spring 28. The valve is opened by means of the levers 29 carried on lugs 30 and pivoted at their inner ends to the stem 31 of the valve. The valve is opened by the connection 32, which engages the outer ends of the levers 29 when the connection is moved inward to operative position.

After the plates 1, 2 and 3 have been assembled in a container and air exhausted therefrom, the parts as thus assembled are placed in a hydraulic press or tank for the application of heat and pressure. The particular form of press apparatus is immaterial insofar as the present invention is concerned, but either of the presses shown in my copending applications, Serial Number 252,205 and Serial Number 252,206, of even date herewith, may be used to advantage. These applications have eventuated in Patents 1,732,022 and 1,732,023 both issued Oct. 15, 1929. Preferably a large number of the assembled sets of plates in their containers are placed in the press and treated at one time in order to secure economy of operation. To facilitate the insertion of a number of containers and the sheets therein at one time into the press, a rack, such as that shown in Fig.

11, is preferably employed, such rack being similar in construction to that illustrated in my copending application, Serial Number 252,206 above referred to. This rack consists of a base 33 provided with upstanding ribs 34 and a central stand pipe 35. The stand pipe carries a top member 36, which can be moved up and down on the stand pipe and is provided with a depending flange or band 37. The top member 39 is maintained in elevated position during the filling of the rack, after which it is moved down so that the flange 37 lies outside the edges of the containers, thus maintaining them against tipping. The ribs 34 provide radial slots for receiving the lower ends of the containers and for steadying them after their insertion and before the top 36 has been lowered. After the rack has been filled, it is moved to the press on a truck or any other suitable device and placed in the hydraulic press. In case the hydraulic press is of the vertical type, the eye bolt 38 is useful for engagement with an overhead crane in lowering the device into the press.

What I claim is:

1. In combination in apparatus for use in securing together a set of sheets of similar size arranged in a pile, comprising a frame fitting around the sheets, and approximating in thickness the thickness of said set, and a relatively flat container of soft rubber composition closed at one end and open at the other in which said frame fits with the end of the frame projecting into the open end of the container and making sealing contact therewith.

2. In combination in apparatus for use in securing together a set of sheets of similar size arranged in a pile, comprising a frame fitting around the sheets and approximating in thickness the thickness of said set, and a relatively flat container of soft rubber composition closed at one end and open at the other in which said frame fits, with the outer end of said frame constituting the closure of said open end of the container making a tight sealing contact therewith.

3. In combination in apparatus for use in securing together a set of sheets of similar size arranged in a pile, comprising a frame fitting around the sheets, slightly greater in thickness than the thickness of said set, and a relatively flat container of soft rubber composition closed at one end and open at the other in which said frame fits with the end of the frame projecting into the open end of the container and making sealing contact therewith.

4. In combination in apparatus for use in securing together a set of sheets of similar size arranged in a pile, comprising a frame fitting around the sheets and approximating in thickness the thickness of said set, and a relatively flat container of soft rubber composition closed at one end and open at the other in which said frame fits, said frame and container tapering longitudinally to permit the ready insertion of the frame into the container and its removal therefrom with the outer end of said frame constituting the closure of said open end of the container and making a tight sealing contact therewith.

5. In combination in apparatus for use in securing together a set of sheets of similar size arranged in a pile, comprising a frame fitting around the sheets and approximating in thickness the thickness of said set, a relatively flat container of soft rubber composition closed at one end and open at the other in which the frame fits, with the outer end of said frame constituting the closure of said open end of the container and having an air passage therethrough, and a valve for said passage.

6. In combination in apparatus for use in securing together a set of sheets of similar size arranged in a pile, comprising a frame fitting around the sheets and approximating in thickness the thickness of said set, and a relatively flat container of soft rubber composition closed at one end and open at the other in which said frame fits with the outer end of said frame projecting from the open end of the bag and constituting the closure therefor with the surface of the container in sealing contact with the frame.

7. In combination in apparatus for use in securing together a set of sheets of similar size arranged in a pile, comprising a frame fitting around the sheets and approximating in thickness the thickness of said set, a flexible bottom for said frame secured at its edges to said frame, and a relatively flat container of soft rubber composition closed at one end and open at the other in which said frame fits, said frame constituting the closure of the open end of the container and making a sealing contact therewith.

In testimony whereof, I have hereunto subscribed my name this 27th day of January, 1928.

WILLIAM O. LYTLE.